(12) United States Patent
Swarup et al.

(10) Patent No.: US 9,221,993 B2
(45) Date of Patent: Dec. 29, 2015

(54) WATERBORNE ACRYLIC COATING COMPOSITIONS

(71) Applicant: PPG Industries Ohio, Inc., Cleveland, OH (US)

(72) Inventors: Shanti Swarup, Allison Park, PA (US); Courtney Lyn Balliet, Pittsburgh, PA (US); Derrard Hall, Victoria (AU); Irina Schwendeman, Wexford, PA (US); John E. Schwendeman, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/230,347

(22) Filed: Mar. 31, 2014

(65) Prior Publication Data

US 2015/0275027 A1     Oct. 1, 2015

(51) Int. Cl.
| | |
|---|---|
| *C09D 133/24* | (2006.01) |
| *C09D 133/12* | (2006.01) |
| *B32B 15/085* | (2006.01) |
| *C08F 220/58* | (2006.01) |
| *C08F 2/22* | (2006.01) |
| *C08F 220/06* | (2006.01) |
| *C08F 220/14* | (2006.01) |
| *C08F 220/20* | (2006.01) |

(52) U.S. Cl.
CPC ................................... *C09D 133/12* (2013.01)

(58) Field of Classification Search
CPC .. C09D 133/12; C09D 133/24; B32B 15/082; B32B 2255/06; B32B 2333/00
USPC ................... 524/813, 817, 829, 831; 428/462
See application file for complete search history.

(56) References Cited

U.S. PATENT DOCUMENTS

| | | | |
|---|---|---|---|
| 4,166,882 A | 9/1979 | Das et al. | |
| 4,329,268 A | 5/1982 | Suzuki et al. | |
| 4,332,657 A * | 6/1982 | Makuuchi et al. | ............. 523/300 |
| 4,358,403 A * | 11/1982 | Distler et al. | ................. 524/745 |
| 5,723,555 A | 3/1998 | Swarup et al. | |
| 2013/0136848 A1 | 5/2013 | Hawkett et al. | |

FOREIGN PATENT DOCUMENTS

| | | | |
|---|---|---|---|
| JP | 57180607 A | | 11/1982 |
| JP | 2001139607 A | | 5/2001 |
| JP | 2001207007 A | | 7/2001 |
| JP | 2002105272 A | | 4/2002 |
| WO | WO 9509890 A1 | | 4/1995 |
| WO | WO 03089477 A1 | | 10/2003 |
| WO | WO 2013/056847 A1 | * | 4/2013 |

OTHER PUBLICATIONS

Materials and Applications: Paints, 8 pages; retrieved from Internet: http://www.essentialchemicalindustry.org/material-and-applications/paints.html (Date last amended: Mar. 18, 2013).*

* cited by examiner

*Primary Examiner* — Fred M Teskin
(74) *Attorney, Agent, or Firm* — Justin P. Martinchek

(57) ABSTRACT

A waterborne coating composition includes latex particles and a crosslinker. The latex particles can be prepared from a mixture of reactants including: (a) a monomer represented by formula (I):

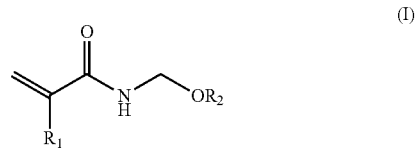

(I)

where $R_1$ is a hydrogen or methyl group and $R_2$ is a hydrogen, alkyl, or aryl group; (b) a multi-ethylenically unsaturated monomer; and (c) a mono-ethylenically unsaturated functional monomer different from in the monomer represented by formula (I), the mono-ethylenically unsaturated functional monomer having a functional group selected from a hydroxyl group, thiol group,

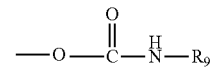

group, or a mixture thereof, where $R_9$ is a hydrogen, alkyl, or aryl group. A method of preparing waterborne coating compositions and substrates coated with the compositions are also disclosed.

23 Claims, No Drawings

WATERBORNE ACRYLIC COATING COMPOSITIONS

FIELD OF THE INVENTION

The present invention relates to acrylic latex particles, coating compositions comprising such particles, and substrates to which such coatings are applied.

BACKGROUND OF THE INVENTION

Acrylic polymers have been used to prepare various types of coatings such as coil coatings. Coil coatings are often applied by a roller application to metal coils (strips or long sheets), such as galvanized steel coils or aluminum coils. Coated coils are commonly used for producing ceiling and wall elements, doors, pipe insulations, building sidewall panels and roofing panels, profile elements for washing machines, dishwashers, freezers, refrigerators, and ranges, among other items. As will be appreciated, these coatings are frequently exposed to moisture, high humidity, and other conditions. As such, acrylic based coil coatings should exhibit good hardness, resistance to water spotting, and exterior durability.

In addition, it is desired that acrylic coatings are water-based in order to limit emissions of volatile organic compounds (VOCs) into the environment. Water-based coatings are also generally less costly as compared to coatings that use large amounts of organic solvents.

Thus, it would be desirable to provide a water-based acrylic coating composition that exhibits improved hardness, resistance to water spotting, and exterior durability as compared to acrylic coating compositions currently available.

SUMMARY OF THE INVENTION

In certain embodiments, the present invention is directed to a waterborne coating composition comprising latex particles and a crosslinker, said latex particles prepared from a mixture of reactants comprising: (a) a monomer represented by formula (I):

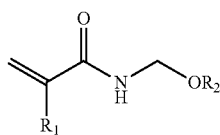

(I)

wherein $R_1$ is a hydrogen or methyl group and $R_2$ is a hydrogen, alkyl, or aryl group; (b) a multi-ethylenically unsaturated monomer; and (c) a mono-ethylenically unsaturated functional monomer different from the monomer represented by formula (I), the mono-ethylenically unsaturated functional monomer comprising a functional group selected from a hydroxyl group, thiol group,

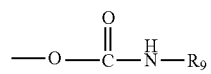

group, or a mixture thereof, wherein $R_9$ is a hydrogen, alkyl, or aryl group.

In certain embodiments, the present invention is also directed to a method of preparing a waterborne coating composition comprising: (a) mixing in an aqueous medium, reactants comprising: (i) a monomer represented by formula (I):

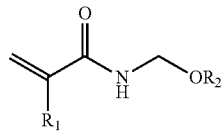

(I)

wherein $R_1$ is a hydrogen or methyl group and $R_2$ is a hydrogen, alkyl, or aryl group; (ii) a multi-ethylenically unsaturated monomer; and (iii) a mono-ethylenically unsaturated functional monomer different from the monomer represented by formula (I), the mono-ethylenically unsaturated functional monomer comprising a functional group selected from a hydroxyl group, thiol group,

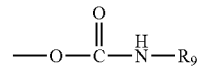

group, or a m tore thereof, wherein $R_9$ is a hydrogen, alkyl, or aryl group; (b) polymerizing the mixture of reactants to form a dispersion of latex particles; and (c) adding a crosslinker to the dispersion of latex particles to crosslink the latex particles.

In certain embodiments, a substrate is at least partially coated with the waterborne coating compositions described herein.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" crosslinker, "a" latex particle, "a" monomer, "a" multi-ethylenically unsaturated monomer, "a" mono-ethylenically unsaturated functional monomer, "a" mono-ethylenically unsaturated non-functional monomer, "a" mono-ethylenically unsaturated carboxylic acid functional monomer, and the like refer to one or more of any of these items.

In certain embodiments, the present invention is directed to a waterborne coating composition that includes a crosslinker and latex particles. As used herein, the term "waterborne" refers to coating compositions in which the solvent for the coating compositions comprises more than 50% water, based on the total weight of the solvent. In certain embodiments, the solvent for the coating compositions comprises more than 60% water, such as more than 70% water, such as more than 80% water, or more than 90% water, based on the total weight of the solvent.

In certain embodiments, the solvent for the coating compositions can include an organic solvent or solvents mixed with water. Non-limiting examples of organic solvents that can be used include glycols, glycol ether alcohols, alcohols, and ketones. Other non-limiting examples of organic solvents include aromatic and aliphatic hydrocarbons.

As indicated above, in certain embodiments, the waterborne coating compositions of the present invention can include latex particles. As used herein, the term "latex particle" refers to a suspension of polymer microparticles in water. In certain embodiments, the latex particles can be prepared by a mixture of reactants that includes at least one mono-ethylenically unsaturated functional monomer. As used herein, the term "mono-ethylenically unsaturated monomer" refers to a monomer that only has one site of ethylenic unsaturation. As used herein, the term "ethylenic unsaturation" refers to aliphatic carbon-carbon double bonds. Thus, a "mono-ethylenically unsaturated monomer" refers to a monomer that has only one aliphatic carbon-carbon double bond.

Further, as indicated above, the mono-ethylenically unsaturated monomer can include a mono-ethylenically unsaturated functional monomer. An "ethylenically unsaturated functional monomer" refers to a monomer having at least one site of ethylenic unsaturation and which also includes a functional group that is reactive with other functional groups and takes part in a crosslinking reaction. In the crosslinking reaction, the functional group reacts with another functional group to form a chemical bond. Non-limiting examples of functional groups include carboxyl groups, epoxy groups, carbamate groups, both secondary and primary, hydroxyl groups, N-alkoxymethylamide groups, and thiol groups. In certain embodiments, the functional groups of the ethylenically unsaturated functional monomers are reactive with a crosslinking agent including, but not limited to, aminoplast resins and/or isocyanate functional crosslinkers.

In certain embodiments, the latex particles can be formed by a mono-ethylenically unsaturated functional monomer that is represented by formula (I):

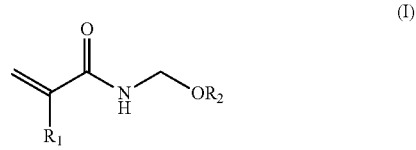

wherein $R_1$ is a hydrogen or methyl group and $R_2$ is a hydrogen, alkyl, or aryl group.

The term "alkyl" refers to a saturated hydrocarbon chain. The alkyl groups may include a specified number of carbon atoms. For example, $C_1$-$C_{12}$ alkyl indicates that the alkyl group may have 1, 2, 3, 4, 5, 6, 7, 8, 9, 10, 11, or 12 carbon atoms. In certain embodiments, the alkyl group may be a $C_1$-$C_{12}$ alkyl group, a $C_1$-$C_{10}$ alkyl group, a $C_1$-$C_8$ alkyl group, a $C_1$-$C_6$ alkyl group, or a $C_1$-$C_4$ alkyl group.

In certain embodiments, the alkyl group may be substituted with one or more substituents. The term "substituent" refers to a group substituted onto any atom of the alkyl group. Non-limiting examples of groups that may be substituted onto an atom of an alkyl group include acyl, acylamido, acyloxy, alkoxy, alkyl, alkenyl, alkynyl, amido, amino, carboxy, cyano, ester, halo, haloalkyl, hydroxy, imino, nitro, oxo, phosphonate, sulfonyl, sulfonate, sulfonamino, sulfonamido, thioamido, thiol, and mixtures thereof.

The term "aryl" refers to a group derived from an aromatic group containing a single aromatic ring or multiple aromatic rings that are fused together, directly linked, or indirectly linked. The term "aromatic" refers to a cyclically conjugated hydrocarbon with a stability (due to delocalization) that is significantly greater than that of a hypothetical localized structure. Non-limiting examples of aryl groups include phenyl, naphthyl, biphenyl, diphenylether, diphenylamine, benzophenone, and mixtures thereof. In certain embodiments, the aryl groups may be substituted with one or more of the substituents described above.

In certain embodiments, $R_2$ may be an alkyl group such that formula (I) represents an N-alkoxymethyl-(meth)acrylamide monomer in which $R_1$ may be a methyl group or a hydrogen as indicated above. As used herein, "(meth)acrylamide" and terms derived therefrom are intended to include both acrylamide and methacrylamide derivatives. For example, in certain embodiments, $R_2$ may be an alkyl group and $R_1$ may be a methyl group such that formula (I) represents an N-alkoxymethyl-methacrylamide monomer. Alternatively, in some embodiments, $R_2$ may be an alkyl group and $R_1$ may be a hydrogen such that formula (I) represents an N-alkoxymethyl-acrylamide monomer.

In some of these embodiments, $R_2$ may be a $C_1$-$C_4$ alkyl group. For example, $R_2$ may be a $C_4$ alkyl group to form an N-butoxymethyl-(meth)acrylamide monomer. Other non-limiting examples of N-alkoxymethyl-(meth)acrylamide monomers that can be used to prepare the present latex particles include N-methoxymethyl-(meth)acrylamide, N-ethoxymethyl-(meth)acrylamide, N-propoxymethyl-(methyl)acrylamide, N-pentoxymethyl-(meth)acrylamide, N-isobutoxymethyl-(meth)acrylamide, N-tert-butyl-(meth)acrylamide, N-cyclohexoxymethyl-(meth)acrylamide, and mixtures thereof.

In certain embodiments, $R_2$ may be a hydrogen such that formula (I) represents an N-hydroxymethyl(meth)acrylamide monomer in which $R_1$ may be a methyl group or a hydrogen as indicated above. For example, in some embodiments, $R_2$ may be a hydrogen and $R_1$ may be a methyl group such that formula (I) represents an N-hydroxymethyl methacrylamide monomer. Alternatively, in other embodiments, $R_2$ may be a hydrogen and $R_1$ may be a hydrogen such that formula (I) represents an N-hydroxymethyl acrylamide monomer.

In certain embodiments, $R_2$ may be an aryl group. In some of these embodiments, the aryl group can be a phenyl such that formula (I) represents an N-phenoxymethyl (meth)acrylamide monomer in which $R_1$ may be a methyl group or a hydrogen as indicated above.

In certain embodiments, a mono-ethylenically unsaturated functional monomer that is represented by formula (I) comprises from 2 to 25 weight % of the latex particles based on the total weight of the monomers. In some of these embodiments, a mono-ethylenically unsaturated functional monomer that is represented by formula (I) comprises from 2 to 15 weight %, or from 2 to 10 weight % of the latex particles, based on the total weight of the monomers.

The mixture of reactants that can be used to prepare the latex particles of the present invention can also include an additional mono-ethylenically unsaturated functional monomer that is different from formula (I). In certain embodiments, the mono-ethylenically unsaturated functional monomer that is different from formula (I) comprises a functional group selected from a hydroxyl group, thiol group,

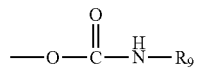

group, or a mixture thereof. $R_9$ can be a hydrogen, alkyl, or aryl group. In certain embodiments, the alkyl group may be a $C_1$-$C_{12}$ alkyl group, a $C_1$-$C_{10}$ alkyl group, a $C_1$-$C_8$ all group, a $C_1$-$C_6$ alkyl group, or a $C_1$-$C_4$ alkyl group. Further, as used herein, the term "thiol" refers to a mercaptan group, that is, an "SH" group.

In certain embodiments, the mono-ethylenically unsaturated functional monomer that is different from formula (I) is represented by formula (III):

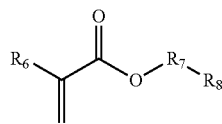

(III)

wherein $R_6$ can be a hydrogen or methyl group, $R_7$ can be a $C_2$-$C_{12}$ alkylene group or a polyether, and $R_8$ can be a hydroxyl, thiol, or

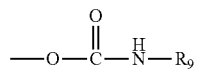

group. $R_9$ can be a hydrogen, alkyl, or aryl group. As used herein, the term "alkylene" refers to a fully saturated straight or branched chain divalent hydrocarbon radical. The $C_2$-$C_{12}$ alkylene group may be substituted with one or more substituents as described above. In certain embodiments, $R_8$ can be a hydroxyl group such that formula (III) represents a hydroxyalkyl(meth)acrylate, In certain embodiments, $R_8$ can be a hydroxyl group such that formula (III) represents a hydroxyalkyl(meth)acrylate in which $R_6$ can be a hydrogen or methyl group and $R_7$ can be a $C_2$-$C_{12}$ alkylene group or a polyether as indicated above. Non-limiting examples of hydroxyalkyl(meth)acrylates that can be used to prepare the latex particles of the present invention include hydroxybutyl(meth)acrylate such as 4-hydroxybutyl(meth)acrylate, 2-hydroxyethyl(meth)acrylate, 2-hydroxypropyl(meth)acrylate, or a mixture thereof.

In some embodiments, $R_8$ can be a thiol group such that formula (III) represents a mercaptoalkyl(meth)acrylate monomer in which $R_6$ can be a hydrogen or methyl group and $R_7$ can be a $C_2$-$C_{12}$ alkylene group or a polyether as indicated above.

In other embodiments, $R_8$ can be a

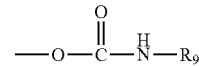

group, wherein $R_9$ can be a hydrogen, alkyl, or aryl group, such that formula (III) represents a carbamate(meth)acrylate monomer in which $R_6$ can be a hydrogen or methyl group and $R_7$ can be a $C_2$-$C_{12}$ alkylene group or a polyether as indicated above. Non-limiting examples of a carbamate(meth)acrylate monomer include methyl carbamate(meth)acrylate, ethyl carbamate(meth)acrylate, n-propyl carbamate(meth)acrylate, n-butyl carbamate(meth)acrylate, t-butyl carbamate (meth)acrylate, phenyl carbamate(meth)acrylate, and mixtures thereof.

In certain embodiments, the mono-ethylenically unsaturated functional monomer that is different from the monomer represented by formula (I) comprises from 5 to 25 weight % of the latex particles based on the total weight of the monomers. In some of these embodiments, a mono-ethylenically unsaturated functional monomer that is different from the monomer represented by formula (I) comprises from 5 to 20 weight %, or from 5 to 15 weight % of the latex particles based on the total weight of the monomers.

As indicated, the mixture of reactants that can be used to prepare the latex particles of the present invention can also include a multi-ethylenically unsaturated monomer. As used herein, a "multi-ethylenically unsaturated monomer" refers to a monomer that has more than one site of ethylenic unsaturation. As such, a "multi-ethylenically unsaturated monomer" refers to a monomer that has two or more aliphatic carbon-carbon double bonds.

The multi-ethylenically unsaturated monomer can be a multi-ethylenically unsaturated functional monomer such that the monomer contains at least two sites of ethylenic unsaturation and which also includes a functional group that is reactive with other functional groups and takes part in a crosslinking reaction. Non-limiting examples of functional groups include any of the functional groups described above.

Alternatively, in other embodiments, the multi-ethylenically unsaturated monomer can be a multi-ethylenically unsaturated non-functional monomer. As used herein, an ethylenically unsaturated non-functional monomer refers to a monomer having at least two sites of ethylenic unsaturation and which does not contain functional groups that are reactive with other functional groups. Non-limiting examples of non-functional groups include alkyl, cycloalkyl, aryl, alkyl ethers, alkyl esters, and mixtures thereof.

Non-limiting examples of multi-ethylenically unsaturated monomers include allyl(meth)acrylate, vinyl(meth)acrylate, divinyl benzene, ethylene glycol di(meth)acrylate, di-allyl phthalate, 1,6-hexanediol di(meth)acrylate, trimethylolpropane tri(meth)acrylate, dicyclopentenyl oxyethyl(meth)acrylate, triallyl cyanurate, triallyl isocyanurate, glycerol tri(meth)acrylate, and mixtures thereof.

In certain embodiments, the multi-ethylenically unsaturated monomer can include a diacrylate monomer. As used herein, the term "diacrylate monomer" refers to a monomer comprising two acrylate moieties. In some of these embodiments, the multi-ethylenically unsaturated monomer comprising two acrylate moieties is represented by formula (II):

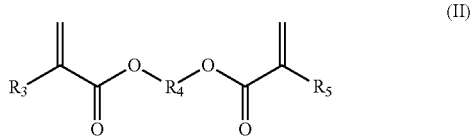

(II)

wherein $R_3$ and $R_5$ independently are a hydrogen or methyl group and $R_4$ is a $C_2$-$C_{12}$ alkylene group or a polyether group. The $C_2$-$C_{12}$ alkylene group may be substituted with one or more substituents. Non-limiting examples of monomers represented by formula (II) that can be used to prepare the latex particles of the present invention include 1,3-butylene glycol di(meth)acrylate, 1,4-butanediol di(meth)acrylate, 1,6-hexanediol di(meth)acrylate, 1,9-nonanediol di(meth)acrylate, 1,10-decanediol di(meth)acrylate, ethylene glycol di(meth)acrylate, di(ethylene glycol)di(meth)acrylate, di(propylene glycol)di(meth)acrylate, and mixtures thereof.

In certain embodiments, a multi-ethylenically unsaturated functional monomer comprises from 2 to 15 weight % based on the total weight of the latex particles based on the total weight of the monomers. In some of these embodiments, a multi-ethylenically unsaturated functional monomer comprises from 2 to 10 weight %, or from 5 to 10 weight % of the latex particles based on the total weight of the monomers.

It was found that the multi-ethylenically unsaturated monomer used with the mixture of reactants to prepare the latex particles of the present invention improved durability of the coating composition. For instance, it was found that the increased crosslinking density within the latex particles imparted by the multi-ethylenically unsaturated monomer improved both the hardness and humidity resistance of the finished coating.

The mixture of reactants that can be used to prepare the latex particles of the present invention can include monomers in addition to the monomers described above. Such additional monomers can be used to improve hardness, adhesion, flexibility, and durability of the latex particles described herein. For example, in certain embodiments, the mixture of reactants that can be used to prepare the latex particles of the present invention can further include a mono-ethylenically unsaturated non-functional monomer. The term "mono-ethylenically unsaturated non-functional monomer" refers to a monomer having one site of ethylenic unsaturation and which does not contain functional groups that are reactive with other functional groups. Non-limiting examples of non-functional groups include any of the non-functional groups mentioned above.

Non-limiting examples of mono-ethylenically unsaturated non-functional monomers that can be used to prepare the latex particles of the present invention include methyl(meth)acrylate, ethyl(meth)acrylate, n-butyl(meth)acrylate, iso-butyl(meth)acrylate, t-butyl(meth)acrylate, 2-ethylhexyl(meth)acrylate, lauryl(meth)acrylate, isodecyl(meth)acrylate, stearyl(meth)acrylate, cyclohexyl(meth)acrylate, isobornyl (meth)acrylate, styrene, vinyl acetate, and methoxy terminated polyether(meth)acrylates, such as Bisomer® MPEG 350 MA (available from GEO Specialty Chemicals), and mixtures thereof.

In certain embodiments, a mono-ethylenically unsaturated non-functional monomer comprises from 30 to 90 weight % of the latex particles based on the total weight of the monomers. In some of these embodiments, a mono-ethylenically unsaturated non-functional monomer comprises from 57 to 90 weight %, such as from 68 to 87 weight % of the latex particles based on the total weight of the monomers.

Other monomers that can used to prepare the latex particles include mono-ethylenically unsaturated carboxylic acid functional monomers. As used herein, the term "mono-ethylenically unsaturated carboxylic acid functional monomer" refers to a monomer having one site of ethylenic unsaturation and at least one carboxylic acid group including its anhydride or ester that is reactive with other functional groups and can take part in a crosslinking reaction. Non-limiting examples of mono-ethylenically unsaturated carboxylic acid functional monomers that can be used to prepare the latex particles include (meth)acrylic acid, canonic acid, itaconic acid, fumaric acid, and maleic acid.

In certain embodiments, a mono-ethylenically unsaturated carboxylic acid functional monomer comprises from 0.2 to 5 weight % of the latex particles based on the total weight of the monomers. In some of these embodiments, a mono-ethylenically unsaturated carboxylic acid functional monomer comprises from 1 to 3 weight %, such as from 1 to 2 weight % of the latex particles based on the total weight of the monomers.

In certain embodiments, the glass transition in temperature ("Tg") of the latex particles ranges from about 0° C. to 60° C., such as 5° C. to 50° C., or 5° C. to 40° C. The Tg is determined by differential scanning calorimetry. The Tg of the latex particles described herein can help balance the coating hardness with flexibility and resistance to cracking. They also allow the latex particles to coalesce into a smooth film.

As indicated, the latex particles described herein can be used to prepare a waterborne coating composition. In certain embodiments, the latex particles comprise from 50 to 90 weight % of the coating composition based on the total solids of the coating composition. In some of these embodiments, the latex particles comprise from 55 to 80 weight %, or from 60 to 70 weight % of the coating composition based on the total solids of the coating composition. As used herein, "total solids" refer to the total amount of non-volatile components in the composition even though some of the components may be non-volatile liquids rather than solids at room temperature.

In certain embodiments, the coating composition also includes a crosslinker. As used herein, the term "crosslinker" refers to a molecule comprising two or more functional groups that are reactive with other factional groups and which is capable of linking two or more monomers or polymer molecules through chemical bonds. In certain embodiments, the functional groups of the crosslinker are reactive with functional groups of the latex particles. Thus, the crosslinker used with the coating compositions described herein can link the latex particles. It will be appreciated that the coatings of the present invention can cure through the reaction between the functional groups of the latex particles and the functional groups of the crosslinkers. "Curing" refers to bond formation between the latex particles and crosslinker resulting in the formation of a crosslinked coating. Curing may occur upon application of an external stimulus including, but not limited to, heat.

Non-limiting examples of crosslinkers include phenolic resins, amino resins, epoxy resins, beta-hydroxy(alkyl)amide resins, alkylated carbamate resins, isocyanates, polyacids, anhydrides, organometallic acid-functional materials, polyamines, polyamides, aminoplasts, and mixtures thereof.

Non-limiting examples of aminoplasts include condensates of amines and/or amides with aldehyde. The most common amines or amides are melamine, urea, or benzoguanamine. For example, the condensate of melamine with formaldehyde is a suitable aminoplast. However, condensates with other amines or amides can be used; for example, aldehyde condensates of glycoluril. While the aldehyde used is most often formaldehyde, other aldehydes such as acetaldehyde, crotonaldehyde, and benzaldehyde may be used.

The aminoplast contains methylol groups and at least a portion of these groups may be etherified with an alcohol to modify the cure response. Any monohydric alcohol may be employed for this purpose including methanol, ethanol, butanol, and hexanol. Non-limiting examples of commercially available aminoplasts that can be used include CYMEL® 303, CYMEL® 322, CYMEL® 327, CYMEL® 380, and CYMEL® 1130 (available from CYTEK Industries and/or ALLNEX).

In certain embodiments, the crosslinkers comprise from 5 to 25 weight % of the coating composition based on the total solids of the coating composition. In some of these embodiments, the crosslinkers comprise from 5 to 15 weight %, such as from 5 to 10 weight % of the coating composition based on the total solids of the coating composition.

It will be appreciated that the latex particles of the present invention (and crosslinkers if used) can form all or part of the film-forming resin of the coating. In certain embodiments, one or more additional film-forming resins are also used in the coating. For example, the coating compositions can comprise any of a variety of thermoplastic and/or thermosetting compositions known in the art.

Thermosetting or curable coating compositions typically comprise film-forming polymers or resins having functional groups that are reactive with either themselves or a crosslinker. The additional film-forming resin can be selected from, for example, acrylic polymers that are the same or different than those described above, polyester polymers, polyurethane polymers, polyamide polymers, polyether polymers, polysiloxane polymers, polyepoxy polymers, epoxy resins, vinyl resins, copolymers thereof, and mixtures thereof. Generally, these polymers can be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, area groups, isocyanate groups (including blocked isocyanate groups) mercaptan groups, and combinations thereof. Appropriate mixtures of film-forming resins may also be used in the preparation of the present coating compositions.

Thermosetting coating compositions typically comprise a crosslinker that may be selected from any of the crosslinkers described above or known in the art to react with the functionality used in the coating compositions. In certain embodiments, the present coatings comprise a thermosetting film-forming polymer or resin and a crosslinker and the crosslinker is either the same or different from the crosslinker that is used to crosslink the latex particles described herein. In certain other embodiments, a thermosetting film-forming polymer or resin having functional groups that are reactive with themselves are used; in this manner, such thermosetting coatings are self-crosslinking.

The coating compositions of the present invention can also include other optional materials well known in the art of formulating coatings. For example, the coating compositions of the present invention can also include a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, iriarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, corrosion resistant particles, corrosion inhibiting additives, fillers including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

In certain embodiments, the coating compositions include pigment particles that may comprise from 20 to 70 weight %, or from 30 to 60 weight % based on total weight of the coating composition. In some of these embodiments, the pigment particles are inorganic pigment particles.

The coatings of the present invention can be applied to a wide range of substrates known in the coatings industry. For example, the coatings of the present invention can be applied to automotive substrates, industrial substrates, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hotdipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

In certain embodiments, the coatings of the present invention can be applied to a coil. For example, in some of these embodiments, the coatings of the present invention can be applied to a metal coil including, bat not limited to, galvanized steel coils and aluminum coils.

The coatings of the present invention can he applied by any means standard in the art, such as electrocoating, spraying, electrostatic spraying, dipping, rolling, brushing, and the like. The coatings of the present invention can he applied to a dry film thickness of 0.3 mils to 2 mils, such as from 0.5 mils to 1 mil, or from 0.85 mils to 0.95 mils.

It was found that the coating compositions described herein provided improved hardness, resistance to water spotting, and exterior durability as compared to current acrylic based coatings. For example, when applied to a galvanized steel coil having a primer coating, the coating compositions described herein exhibited good gloss retention at 60° C., no blistering, and no visible water whitening under accelerated weathering. The coating compositions also exhibited good pencil hardness of at least 2H or greater, as determined in accordance with ASTM D3363-92a. As used herein, the term "primer coating" refers to a coating that is used as an undercoating deposited onto a substrate in order to prepare the surface for application of a protective or decorative coating system. Thus, the coating compositions of the present invention exhibit properties that are useful for a variety of coating applications, and particularly, for coil coatings.

The following examples are presented to demonstrate the general principles of the invention. The invention should not be considered as limited to the specific examples presented. All parts and percentages in the examples are by weight unless otherwise indicated.

EXAMPLES

Part A: Preparation of Acrylic Latex Particles

Control Example 1

To a 5 titer round-bottom flask, 618.1 grams of deionized water was added. The water was sparged with nitrogen while heating to 78° C. with stirring. At 78° C., the nitrogen sparge was replaced with a nitrogen blanket and a pre-mixed charge of 69.1 grams of nitrogen sparged deionized water, 1.282 grams of sodium bicarbonate, 1.024 grams of TERGITOL™ NP-9 surfactant (available from Dow Chemical Co.), and 2.043 grams of STEPANOL® WAC surfactant (available from Stepan Co.) was added to the flask and rinsed with 27.7 grams of nitrogen sparged deionized water. A pre-emulsion was prepared from the ingredients in Table 1 below and mixed in a separate flask using a magnetic stirrer.

TABLE 1

| Ingredients | Parts by Weight (grams) |
|---|---|
| Deionized water (nitrogen sparged) | 723.1 |
| STEPANOL ® WAC | 25.6 |
| TERGITOL ™ NP-9 Surfactant | 34.6 |
| AEROSOL ® MA-80-I Surfactant[1] | 17.6 |
| IGEPAL ® CO-897 EP[2] | 25.6 |
| 2-Hydroxypropyl methacrylate | 87.9 |
| n-Butoxymethyl acrylamide solution (57%)[3] | 87.9 |
| Acrylic acid | 17.6 |
| Methyl methacrylate | 788.7 |
| n-Butyl acrylate | 781.7 |

[1]Surfactant available from Cytek Industries, Inc.
[2]Surfactant available from Rhodia, Inc.
[3]Monomer available from Dorf Ketal Chemicals.

About 61.4 grams of the pre-emulsion was added over 5 minutes (for seed stage), followed by a mixture of 44.3 grams of nitrogen sparged deionized water and 4.12 grams of ammonium persulfate. After rinsing these charges with 20.1 grams of nitrogen sparged deionized water, the reaction mixture was allowed to stir for 30 minutes. The remainder of the pre-emulsion was then added to the reaction flask over 210 minutes, followed by a rinse with 23.7 grams of nitrogen sparged deionized water. The reaction mixture was allowed to stir for 10 minutes, then a mixture of 67.2 grams of nitrogen sparged deionized water and 1.254 grams of phosphoric acid (85% solution in water) was added over 30 minutes. The charge was rinsed with 16.6 grams of nitrogen sparged deionized water and the reaction mixture was allowed to stir for 60 minutes. A mixture of 62.2 grams of deionized water, 0.411 grams of TERGITOL™ NP -9 surfactant, 0.409 grams of STEPANOL® WAC surfactant, 34.6 grams of propylene glycol, and 15.4 grams of triethylamine was added to the flask over 20 minutes and rinsed with 10.4 grams of deionized water. When the reaction temperature reached less than 52° C., a mixture of 0.823 grams of ACTICIDE® MBS (available from Thor Specialties, Inc.), 2.008 grams of FOAMASTER® MO 2111 (a defoamer available from BASF), and 3.9 grams of deionized water were added to the reaction flask. The reaction mixture was poured out once the temperature was less than 38° C. The resulting acrylic latex had a measured percent solids (110° C./1 hr) of about 50.0%, a viscosity of 80 cp (Brookfield DV-E viscometer, #1 spindle, 30 rpm, 23.2° C.), and a pH of about 7.8.

Example 2

Acrylic latex particles according to the present invention described herein were prepared as follows: to a 5 liter round-bottom flask 618.1 grams of deionized water were added. The water was sparged with nitrogen while heating to 78° C. with stirring. At 78° C., the nitrogen sparge was replaced with a nitrogen blanket and a pre-mixed charge of 69.1 grams of nitrogen sparged deionized water, 1.283 grams of sodium bicarbonate, 1.025 grams of TERGITOL™ NP-9 Surfactant, and 2.045 grams of STEPANOL® WAC was added to the flask and rinsed with 27.8 grams of nitrogen sparged deionized water. A pre-emulsion was prepared from the ingredients in Table 2 below and mixed in a separate flask using a magnetic stirrer.

TABLE 2

| Ingredients | Parts by Weight (grams) |
|---|---|
| Deionized water (nitrogen sparged) | 723.1 |
| STEPANOL ® WAC | 25.6 |

TABLE 2-continued

| Ingredients | Parts by Weight (grams) |
|---|---|
| TERGITOL ™ NP-9 Surfactant | 34.6 |
| AEROSOL ® MA-80-I Surfactant[1] | 17.6 |
| IGEPAL ® CO-897 EP[2] | 25.6 |
| 4-Hydroxybutyl acrylate | 129.5 |
| n-Butoxymethyl acrylamide solution (57%)[3] | 87.9 |
| Acrylic acid | 17.6 |
| Methyl methacrylate | 887.3 |
| n-Butyl acrylate | 555.0 |

About 62.5 grains of the pre-emulsion was added over 5 minutes (for seed stage), followed by a mixture of 44.3 grams of nitrogen sparged deionized water and 4.10 grams of ammonium persulfate. After rinsing these charges with 20.1 grams of nitrogen sparged deionized water, the reaction mixture was allowed to stir for 30 minutes. Meanwhile, 86.3 grams of 1,6-hexanediol diacrylate was added to the remainder of the pre-emulsion with stirring. After the 30 minute hold, the remainder of the pre-emulsion was added to the reaction flask over 210 minutes, followed by a rinse with 23.5 grams of nitrogen sparged deionized water. The reaction mixture was allowed to stir for 10 minutes, then a mixture of 67.1 grams of nitrogen sparged deionized water and 1.258 grams of phosphoric acid (85% solution in water) were added over 30 minutes. The charge was rinsed with 16.6 grams of nitrogen sparged deionized water and the reaction mixture was allowed to stir for 60 minutes. The heating mantle was removed and a mixture of 62.2 grams of deionized water, 0.421 grams of TERGITOL™ NP-9 Surfactant, 0.416 grams of STEPANOL® WAC, 34.6 grams of propylene glycol, and 15.4 grams of triethylamine were added to the flask over 20 minutes and rinsed with 10.4 grams of deionized water. When the reaction temperature reached less than 52° C., a mixture of 0.811 grams of ACTICIDE® MBS and 3.5 grams of deionized water was added to the reaction flask. The reaction mixture was poured out once the temperature was less than 38° C. The resulting acrylic latex had a measured percent solids (110° C./1 hr) of about 49.9%, a viscosity of 79.6 cp (Brookfield DV-E viscometer, #1 spindle, 50 rpm, 23.0° C.), and a pH of about 8.1.

Example 3

Acrylic latex particles were prepared as follows: to a 5 liter round-bottom flask 618.2 grams of deionized water were added. The water was sparged with nitrogen while heating to 78° C. with stirring. At 78° C., the nitrogen sparge was replaced with a nitrogen blanket and a pre-mixed charge of 69.1 grams of nitrogen sparged deionized water, 1.282 grams of sodium bicarbonate, 1.026 grams of TERGITOL™ NP-9 Surfactant, and 2.051 grams of STEPANOL® WAC was added to the flask and rinsed with 27.8 grains of nitrogen sparged deionized water. A pre-emulsion was prepared from the ingredients in Table 3 below and mixed in a separate flask using a magnetic stirrer.

TABLE 3

| Ingredients | Parts by Weight (grams) |
|---|---|
| Deionized water (nitrogen sparged) | 769.8 |
| STEPANOL ® WAC | 25.6 |
| TERGITOL ™ NP-9 Surfactant | 34.6 |
| AEROSOL ® MA-80-I Surfactant[1] | 17.6 |
| IGEPAL ® CO-897 EP[2] | 25.6 |
| 4-Hydroxybutyl acrylate | 129.5 |

TABLE 3-continued

| Ingredients | Parts by Weight (grams) |
|---|---|
| Acrylic acid | 17.6 |
| Methyl methacrylate | 918.1 |
| n-Butyl acrylate | 574.9 |

About 62.8 grams of the pre-emulsion was added over 5 minutes (for seed stage), followed by a mixture of 44.3 grams of nitrogen sparged deionized water and 4.10 grams of ammonium persulfate. Alter rinsing these charges with 20.2 grams of nitrogen sparged deionized water, the reaction mixture was allowed to stir for 30 minutes. Meanwhile, 86.3 grams of 1,6-hexanediol diacrylate were added to the remainder of the pre-emulsion with stirring. After the 30 minute hold, the remainder of the pre-emulsion was added to the reaction flask over 210 minutes, followed by a rinse with 23.5 grams of nitrogen sparged deionized water. The reaction mixture was allowed to stir for 10 minutes, then a mixture of 67.1 grams of nitrogen sparged deionized water and 1.259 grams of phosphoric acid (85% solution in water) were added over 30 minutes. The charge was rinsed with 16.7 grams of nitrogen sparged deionized water and the reaction mixture were allowed to stir for 60 minutes. The heating mantle was removed and a mixture of 62.3 grams of deionized water, 0.409 grams of TERGITOL™ NP-9 Surfactant, 0.413 grams of STEPANOL® WAC, 34.6 grams of propylene glycol, and 15.4 grams of triethylamine were added to the flask over 20 minutes and rinsed with 10.5 grams of deionized water. When the reaction temperature reached less than 52° C., a mixture of 0.818 grams of ACTICIDE® MBS and 3.5 grams of deionized water were added to the reaction flask. The reaction mixture was poured out once the temperature was less than 38° C. The resulting acrylic latex had a measured percent solids (110° C./1 hr) of about 50.3%, a viscosity of 77 cp (Brookfield DV-E viscometer, #1 spindle, 50 rpm, 23.3° C.), and a pH of about 8.3.

Example 4

Acrylic latex particles were prepared as follows: to 5 liter round-bottom flask 618.1 grams of deionized water were added. The water was sparged with nitrogen while heating to 78° C. with stirring. At 78° C., the nitrogen sparge was replaced with a nitrogen blanket and a pre-mixed charge of 69.2 grams of nitrogen sparged deionized water, 1.283 grams of sodium bicarbonate, 1.027 grams of TERGITOL™ NP-9 Surfactant, and 2.043 grams of STEPANOL® WAC were added to the flask and rinsed with 27.7 grams of nitrogen sparged deionized water. A pre-emulsion was prepared from the ingredients in Table 4 below and mixed in a separate flask using a magnetic stirrer.

TABLE 4

| Ingredients | Parts by Weight (grams) |
|---|---|
| Deionized water (nitrogen sparged) | 723.1 |
| STEPANOL ® WAC | 25.6 |
| TERGITOL ™ NP-9 Surfactant | 34.6 |
| AEROSOL ® MA-80-I Surfactant[1] | 17.6 |
| IGEPAL ® CO-897 EP[2] | 25.6 |
| 4-Hydroxybutyl acrylate | 129.5 |
| n-Butoxymethyl acrylamide solution (57%)[3] | 87.9 |
| Acrylic acid | 17.6 |
| Methyl methacrylate | 956.6 |
| n-Butyl acrylate | 572.3 |

About 61.4 grams of the pre-emulsion were added over 5 minutes (for seed stage), followed by a mixture of 44.3 grams of nitrogen sparged deionized water and 4.10 grams of ammonium persulfate. After rinsing these charges with 20.1 grams of nitrogen sparged deionized water, the reaction mixture was allowed to stir for 30 minutes. The remainder of the pre-emulsion was then added to the reaction flask over 210 minutes, followed by a rinse with 23.7 grams of nitrogen sparged deionized water. The reaction mixture was allowed to stir for 10 minutes, then a mixture of 67.2 grams of nitrogen sparged deionized water and 1.255 grams of phosphoric acid (85% solution in water) were added over 30 minutes. The charge was rinsed with 16.7 grams of nitrogen sparged deionized water and the reaction mixture were allowed to stir for 60 minutes. The heating mantle was removed and a mixture of 62.2 grams of deionized water, 0.426 grams of TERGITOL™ NP-9 Surfactant, 0.413 grams of STEPANOL® WAC, 34.6 grams of propylene glycol, and 15.4 grams of triethylamine were added to the flask over 20 minutes and rinsed with 10.5 grams of deionized water. When the reaction temperature reached less than 52° C., a mixture of 0.822 grams of ACTICIDE® MBS and 3.5 grams of deionized water were added to the reaction flask. The reaction mixture was poured out once the temperature was less than 38° C. The resulting acrylic latex had a measured percent solids (110° C./1 hr) of about 49.6%, a viscosity of 79 cp (Brookfield DV-E viscometer, #1 spindle, 50 rpm, 23.3° C.), and a pH of about 8.2.

Example 5

Acrylic latex particles were prepared as follows: to a 5 liter round-bottom flask 618.1 grams of deionized water were added. The water was sparged with nitrogen while heating to 78° C. with stirring. At 78° C., the nitrogen sparge was replaced with a nitrogen blanket and a pre-mixed charge of 69.2 grams of nitrogen sparged deionized water, 1.283 grams of sodium bicarbonate, 1.027 grams of TERGITOL™ NP-9 Surfactant, and 2.045 grams of STEPANOL® WAC were added to the flask and rinsed with 27.8 grams of nitrogen sparged deionized water. A pre-emulsion was prepared from the ingredients in Table 5 below and mixed in a separate flask using a magnetic stirrer.

TABLE 5

| Ingredients | Parts by Weight (grams) |
| --- | --- |
| Deionized water (nitrogen sparged) | 723.1 |
| STEPANOL ® WAC | 25.6 |
| TERGITOL ™ NP-9 Surfactant | 34.6 |
| AEROSOL ® MA-80-I Surfactant[1] | 17.6 |
| IGEPAL ® CO-897 EP[2] | 25.6 |
| n-Butoxymethyl acrylamide solution (57%)[3] | 88.0 |
| Acrylic acid | 17.6 |
| Methyl methacrylate | 922.1 |
| n-Butyl acrylate | 650.1 |

About 62.5 grams of the pre-emulsion was added over 5 minutes (for seed stage), followed by a mixture of 44.3 grams of nitrogen sparged deionized water and 4.10 grams of ammonium persulfate. After rinsing these charges with 20.0 grams of nitrogen sparged deionized water, the reaction mixture was allowed to stir for 30 minutes. Meanwhile, 86.3 grams of 1,6-hexanediol diacrylate were added to the remainder of the pre-emulsion with stirring. After the 30 minute hold, the remainder of the pre-emulsion was added to the reaction flask over 210 minutes, followed by a rinse with 23.6 grams of nitrogen sparged deionized water. The reaction mixture was allowed to stir for 10 minutes, then a mixture of 67.1 grams of nitrogen sparged deionized water and 1.259 grams of phosphoric acid (85% solution in water) were added over 30 minutes. The charge was rinsed with 16.8 grams of nitrogen sparged deionized water and the reaction mixture was allowed to stir for 60 minutes. The heating mantle was removed and a mixture of 62.2 grams of deionized water, 0.408 grams of TERGITOL™ NP-9 Surfactant, 0.411 grams of STEPANOL® WAC, 34.6 grams of propylene glycol, and 15.4 grams of triethylamine were added to the flask over 20 minutes and rinsed with 10.4 grams of deionized water. When the reaction temperature reached less than 52° C., a mixture of 0.817 grams of ACTICIDE® MBS and 3.5 grams of deionized water were added to the reaction flask. The reaction mixture was poured out once the temperature was less than 38° C. The resulting acrylic latex had a measured percent solids (110° C./1 hr) of about 50.2%, a viscosity of 71 cp (Brookfield DV-E viscometer, #1 spindle, 50 rpm, 23.2° C.), and a pH of about 8.2.

Part B: Preparation of Waterborne Coating Compositions

Examples 6-10

Five (5) coating compositions were prepared from the following mixture of ingredients listed in Table 6.

TABLE 6

| | Parts by weight of Component (grams) | | | | |
| --- | --- | --- | --- | --- | --- |
| Components | Example 6 (control) | Example 7 | Example 8 | Example 9 | Example 10 |
| Acrylic latex particles of Example 1 (Control) | 148.2 | — | — | — | — |
| Acrylic latex particles of Example 2 | — | 148.2 | — | — | — |
| Acrylic latex particles of Example 3 | — | — | 148.2 | — | — |
| Acrylic latex particles of Example 4 | — | — | — | 148.2 | — |
| Acrylic latex particles of Example 5 | — | — | — | — | 148.2 |
| Flattening Slurry[4] | 14.7 | 14.7 | 14.7 | 14.7 | 14.7 |
| White Tint[5] | 3.12 | 3.12 | 3.12 | 3.12 | 3.12 |
| DSX 1525[6] | 4.2 | 4.2 | 4.2 | 4.2 | 4.2 |
| Intermediate Mixture[7] | 35.3 | 36 | 35.3 | 35.3 | 35.3 |
| Black Tint[8] | 34.8 | 34.8 | 34.8 | 34.8 | 34.8 |
| Red Tint[9] | 4.9 | 4.9 | 5.4 | 4.9 | 4.9 |

TABLE 6-continued

| Components | Parts by weight of Component (grams) | | | | |
|---|---|---|---|---|---|
| | Example 6 (control) | Example 7 | Example 8 | Example 9 | Example 10 |
| Yellow Tint[10] | 23.8 | 23.8 | 23.8 | 24.6 | 23.8 |
| Dipropylene Glycol | 2.3 | 2.3 | 2.3 | 2.3 | 2.3 |
| TOTAL | 271.32 | 272.02 | 271.82 | 272.12 | 271.32 |

[4]Flattening slurry consisting of 12.3% flattening pigments and matting agent dispersed in 31.2% melamine/wax/para-toluenesulfonic acid/acrylic/PEG polymer blend and having a solids content of 43.5%.
[5]White tint paste consisting of 64% TiO2 dispersed in 11% melamine/acrylic/PEG polymer blend and having a solids content of 74%.
[6]Additive available from BASF Corporation.
[7]Intermediate mixture consisting of a melamine/wax/para-toluene sulfonic acid/polyacrylate dispersant blend having a solids content of 31%.
[8]Black tint paste consisting of 70% Shepherd Pigments Black 430 dispersed in 15% melamine/acrylic/PEG polymer blend and having a solids content of 85%.
[9]Red tint paste consisting of 69% Rockwood Pigments RO6097 Kroma Red dispersed in 19% melamine/acrylic/PEG polymer blend and having a solids content of 88%.
[10]Yellow list paste consisting of 63% Shepherd Pigments Yellow 25 dispersed in 16% melamine/acrylic/PEG polymer blend and having a solids content of 79%.

Each of the compositions of Examples 6 to 10 were applied to a substrate for evaluation of various tests. The substrate used to test each composition was a 0.236 gauge galvanized steel obtained from a Centria coil line. It was primed with a chromated low gloss polyurethane primer to a dry film thickness of 0.20-0.25 mils. Each composition was drawn down as a topcoat onto the substrate using a number 36 wire draw down bar to a dry film thickness of 0.88-0.92 mils. They were cured in a Hedinair oven with a 30 second oven dwell time at 325° C. in order to reach a peak metal temperature of 232° C.

Physical testing and accelerated weathering testing were performed on the panels coated with the compositions of Examples 6 through 10. The results of the testing is shown in Table 7.

TABLE 7

| | 2000 hours QCT[11] | | 3000 hours of QUVA[12] | | |
|---|---|---|---|---|---|
| Example | Blistering | Visible Water Whitening | 60° % Gloss Retention | Delta E | Pencil Hardness |
| 6 (Control) | none | none | 55 | 2.23 | H |
| 7 | none | none | 85 | 0.286 | 2H-3H |
| 8 | 4-6 medium dense | none | 115 | 0.165 | H |
| 9 | 8 medium | none | 116 | 0.362 | H-2H |
| 10 | 6-8 medium | none | 107 | 0.097 | F |

[11]QCT instrument manufactured by Q-Panel Corporation of Westlake, OH.
[12]QUVA Weathering Tester manufactured by Q-Panel Corporation of Westlake, OH.

In accordance with the testing described in Table 7, high pencil hardness, low delta E values, and % gloss retention values close to 100% are desirable. QUVA testing was performed with cycles consisting of 8 hours of irradiance at 70° C. followed by 4 hours of condensation at 50'C. No blistering or visible water whitening is desirable for QCT testing. The QCT testing was performed at 60° C.

As shown in Table 7 above, Example 7, which was prepared with the acrylic latex particles of the present invention of Example 2, exhibited superior results over the other compositions. Table 7 also confirms that coatings incorporating acrylic latex particles prepared without one of the mono-ethylenically unsaturated functional monomers (Examples 8 and 10) or without multi-ethylenically unsaturated monomers (Examples 6 and 9) according to the present invention described herein exhibited significant blistering, lower pencil hardness, and/or higher delta E values.

Whereas particular embodiments of this invention have been described above for purposes of illustration, it will be evident to those skilled in the art that numerous variations of the details of the present invention may he made without departing from the invention as defined in the appended claims.

The invention claimed is:

1. A waterborne coating composition comprising latex particles and a crosslinker, said latex particles prepared from a mixture of reactants comprising:
   (a) a monomer represented by formula (I):

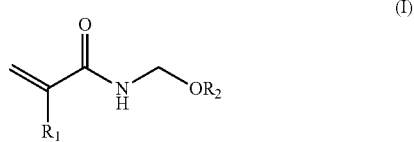

wherein $R_1$ is a hydrogen or methyl group and $R_2$ is a hydrogen, alkyl, or aryl group;
   (b) a multi-ethylenically unsaturated monomer; and
   (c) a mono-ethylenically unsaturated functional monomer different from the monomer represented by formula (I), the mono-ethylenically unsaturated functional monomer comprising a functional group selected from a hydroxyl group, thiol group,

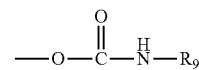

group, or a mixture thereof, wherein $R_9$ is a hydrogen, alkyl, or aryl group,
   wherein the multi-ethylenically unsaturated monomer comprises from 2 to 15 weight % of the latex particles based on the total weight of the monomers.

2. The waterborne coating composition of claim 1, wherein the reactants further comprise a mono-ethylenically unsaturated non-functional monomer.

3. The waterborne coating composition of claim 1, wherein $R_2$ is an alkyl group.

4. The waterborne coating composition of claim 1, wherein the monomer represented by formula (I) comprises N-butoxymethyl-(meth)acrylamide, N-methylol(meth)acrylamide, or a mixture thereof.

5. The waterborne coating composition of claim 1, wherein the multi-ethylenically unsaturated monomer is a monomer represented by formula (II):

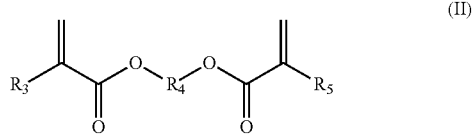

wherein $R_3$ and $R_5$ independently are a hydrogen or methyl group and $R_4$ is a $C_2$-$C_{12}$ alkylene or polyether.

6. The waterborne coating composition of claim 1, wherein the multi-ethylenically unsaturated monomer comprises 1,6- hexanediol diacrylate, 1,10-decanediol diacrylate, ethylene glycol dimethacrylate, or a mixture thereof.

7. The waterborne coating composition of claim 1, wherein the mono-ethylenically unsaturated functional monomer different from the monomer represented by formula (I) is a monomer represented by formula (III):

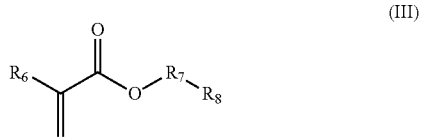

wherein $R_6$ is a hydrogen or methyl group, $R_7$ is a $C_2$-$C_{12}$ alkylene or polyether, and $R_8$ is a hydroxyl, thiol, or

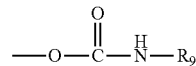

group, wherein $R_9$ is a hydrogen, alkyl, or aryl group.

8. The waterborne coating composition of claim 7, wherein $R_8$ is a hydroxyl group.

9. The waterborne coating composition of claim 1, wherein the mono-ethylenically unsaturated functional monomer different from the monomer represented by formula (I) comprises hydroxybutyl(meth)acrylate, hydroxyethyl(meth)acrylate, hydroxypropyl(meth)acrylate, or a mixture thereof.

10. The waterborne coating composition of claim 2, wherein the ethylenically unsaturated non-functional monomer comprises methyl methacrylate, n-butyl acrylate, or a mixture thereof.

11. The waterborne coating composition of claim 1, wherein the monomer represented by formula (I) comprises from 2 to 25 weight % of the latex particles based on the total weight of the monomers.

12. The waterborne coating composition of claim 1, wherein the mono-ethylenically unsaturated functional monomer different from the monomer represented by formula (I) comprises from 5 to 25 weight % of the latex particles based on the total weight of the monomers.

13. The waterborne coating composition of claim 2, wherein the mono-ethylenically unsaturated non-functional monomer comprises from 45 to 90 weight % of the latex particles based on the total weight of the monomers.

14. The waterborne coating composition of claim 1, wherein the reactants further comprise a mono-ethylenically unsaturated carboxylic acid functional monomer.

15. The waterborne coating composition of claim 14, wherein the carboxylic acid functional monomer comprises from 0.2 to 5 weight % of the latex particles based on the total weight of the monomers.

16. The waterborne coating composition of claim 1, wherein the latex particles have a glass transition temperature from 0 to 60° C.

17. The waterborne coating composition of claim 1, wherein the latex particles comprise from 50 to 90 weight % of the coating composition based on the total solids of the coating composition.

18. The waterborne coating composition of claim 1, further comprising a pigment particle.

19. A substrate at least partially coated with the waterborne coating composition of claim 1.

20. The coated substrate of claim 19, wherein the substrate comprises a metal coil.

21. A method of preparing a waterborne coating composition comprising:
 (a) mixing, in an aqueous medium, a mixture of reactants comprising:
  (i) a monomer represented by formula (I):

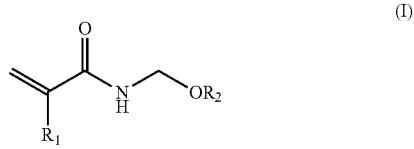

wherein $R_1$ is a hydrogen or methyl group and $R_2$ is a hydrogen, alkyl, or aryl group;
  (ii) a multi-ethylenically unsaturated monomer; and
  (iii) a mono-ethylenically unsaturated functional monomer different from the monomer represented by formula (I), the mono-ethylenically unsaturated functional monomer comprising a functional group selected from a hydroxyl group, thiol group,

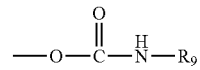

group, or a mixture thereof, wherein $R_9$ is a hydrogen, alkyl, or aryl group.
 (b) polymerizing the mixture of reactants to form a dispersion of latex particles; and
 (c) adding a crosslinker to the dispersion of latex particles to crosslink the latex particles, and
 wherein the multi-ethylenically unsaturated monomer comprises from 2 to 15 weight % of the latex particles based on the total weight of the monomers.

22. The method of claim 21, wherein the reactants further comprise a mono-ethylenically unsaturated non-functional monomer.

23. The method of claim 21, wherein the reactants further comprise a mono-ethylenically unsaturated carboxylic acid functional monomer.

* * * * *